(12) United States Patent
Barbosa et al.

(10) Patent No.: US 11,625,449 B2
(45) Date of Patent: Apr. 11, 2023

(54) INTENT-ORIENTED INTERNET BROWSING

(71) Applicants: Natá Barbosa, Joinville (BR); Yang Wang, Champaign, IL (US)

(72) Inventors: Natá Barbosa, Joinville (BR); Yang Wang, Champaign, IL (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 622 days.

(21) Appl. No.: 16/686,811

(22) Filed: Nov. 18, 2019

(65) Prior Publication Data

US 2020/0159790 A1 May 21, 2020

Related U.S. Application Data

(60) Provisional application No. 62/768,326, filed on Nov. 16, 2018.

(51) Int. Cl.
| | | |
|---|---|---|
| *G06F 16/957* | (2019.01) | |
| *G06N 5/04* | (2006.01) | |
| *G06N 20/10* | (2019.01) | |
| *G06F 16/955* | (2019.01) | |
| *G06F 16/953* | (2019.01) | |

(52) U.S. Cl.
CPC .......... *G06F 16/957* (2019.01); *G06F 16/953* (2019.01); *G06F 16/9558* (2019.01); *G06N 5/04* (2013.01); *G06N 20/10* (2019.01)

(58) Field of Classification Search
CPC .. G06F 16/953; G06F 16/9558; G06F 16/957; G06N 20/10; G06N 5/04
See application file for complete search history.

(56) References Cited

U.S. PATENT DOCUMENTS

| | | | |
|---|---|---|---|
| 9,805,370 B1* | 10/2017 | Quigley | H04W 12/033 |
| 2012/0284597 A1* | 11/2012 | Burkard | G06F 40/134 |
| | | | 715/205 |
| 2014/0280501 A1* | 9/2014 | Turner Jr. | H04L 67/18 |
| | | | 709/203 |
| 2017/0270416 A1* | 9/2017 | Sri | G06Q 10/04 |
| 2018/0139056 A1* | 5/2018 | Imai | H04L 9/3247 |
| 2019/0228105 A1* | 7/2019 | Ma | G06F 16/951 |
| 2020/0073921 A1* | 3/2020 | Bradley | G06F 16/986 |

* cited by examiner

*Primary Examiner* — Chau T Nguyen
(74) *Attorney, Agent, or Firm* — David Nocilly

(57) ABSTRACT

A system that provides intent-oriented browsing powered by machine learning and crowdsourcing. The system allows users to enter their intents, which are then assigned to target pages via supervised learning models based on hyperlinks and contributions made by other users. The system has a prediction server that is programmed to receive hyperlinks from a website and return target hyperlinks based on known intent, a user interface for inputting user intent, and a browser programmed to connect to the intent repository and to the prediction server via a user script. The list of supported intents can grow over time based on correct page marks for intent-page mappings as well as via continuous training of machine learning models.

16 Claims, 6 Drawing Sheets

INTENT-ORIENTED INTERNET BROWSING

CROSS-REFERENCE TO RELATED APPLICATIONS

The present application claims priority to U.S. Provisional Application No. 62/768,326, filed on Nov. 16, 2018.

STATEMENT REGARDING FEDERALLY SPONSORED RESEARCH AND DEVELOPMENT

This invention was made with government support under Grant No. 04523 awarded by the Institute on Disability, Independent Living, and Rehabilitation Research (NI-DILRR). The government has certain rights in the invention.

BACKGROUND OF THE INVENTION

1. Field of the Invention

The present invention relates to internet browsing and, more specifically, to a system and method for user intent-oriented browsing across disparate web architectures.

2. Description of the Related Art

Users browse the web for a variety of activities such as fact finding, information gathering, browsing, and transactions, and do so based on different modes, from lean-back Internet to purposeful use. When browsing is not molded to purpose, users have to employ their own strategies to avoid unnecessary work. For example, if the navigation of a website is not structured to support high-level user goals, users may have to browse through multiple web pages and take additional steps to achieve their objectives. Therefore, considering user intent can better assist user interactions with online content, which has been a major subject in modern-day (or third generation) search engines now being used by personal assistants (e.g., Siri, Google Now, Cortana, Alexa) when users perform web search tasks. A recent study showed that users of personal assistants would like to be taken directly to their goal when performing web search tasks rather than being given search results and have to click through them. Therefore, personal assistants could become more effective at completing transactions on websites if websites supported user intents and high-level goals more explicitly.

Unexpected distractions, information overload, and the lack of consistency makes browsing the web all the more challenging for users with visual impairments, more so in completing tasks that may involve visiting many pages. Therefore, in molding browsing to purpose, the web can also become more accessible for users with visual impairments. Users with visual impairments have to adopt strategies such as memorizing links, and exhaustively scanning a page, especially in cases of inter-page navigation—where users have to complete a number of steps before reaching the page of their goal—and in unfamiliar websites. Nevertheless, most work on accessibility has focused on making webpages accessible rather than supporting high-level user goals. Accordingly, there is a need in the field for an intent based browsing approach that can locate desired pages with less navigation.

Therefore, the design of intent-oriented browsing tools can benefit a wide range of users, helping them avoid unnecessary work and navigate tasks that are specific to website categories (e.g., change payment information on shopping websites, edit social media profile on social networking sites) as well as tasks that are more generic and commonly available across different websites, but nonetheless implemented differently (e.g., log in, sign up, contact).

BRIEF SUMMARY OF THE INVENTION

The present invention is a system for enabling and supporting intent-oriented browsing that can more readily direct a user to a desired type of webpage across different websites that may have different architectures and visual structures or languages. The system allows users to enter their browsing intent, which is then used to target pages via machine learning models based on features such as hyperlinks and/or by contributions provided by other users. The system includes an intent repository with intents (initially supported), target pages, and hyperlink hashes. The system also includes a prediction server that is programmed to receive hyperlinks from a website and return target hyperlinks based on known intent. The system further includes a user interface for inputting user intent. The system further includes a browser programmed to connect to the intent repository and to the prediction server via a user script.

The present invention also includes a method of enabling and supporting intent-oriented browsing that can more readily direct a user to a desired type of webpage across different websites that may have different architectures. The method begins with a browser reading a list of intents (initially supported), target pages, and hyperlink hashes from the intent repository. Next, the browser sends hyperlinks on current page to the prediction server. The prediction server then returns classified target hyperlinks for known intents. When a user enters an intent, the browser will check for a target page or hyperlink. When a new target page or hyperlink is identified, either via machine learning, crowdsourcing or background search (e.g., feeling-lucky type of search), the data is sent to the intent repository after the user is redirected. The intent repository may also manage help requests, which are a way for users to get real-time human help finding a page for their intent.

BRIEF DESCRIPTION OF THE SEVERAL VIEWS OF THE DRAWING(S)

The present invention will be more fully understood and appreciated by reading the following Detailed Description in conjunction with the accompanying drawings, in which.

Figure 4:
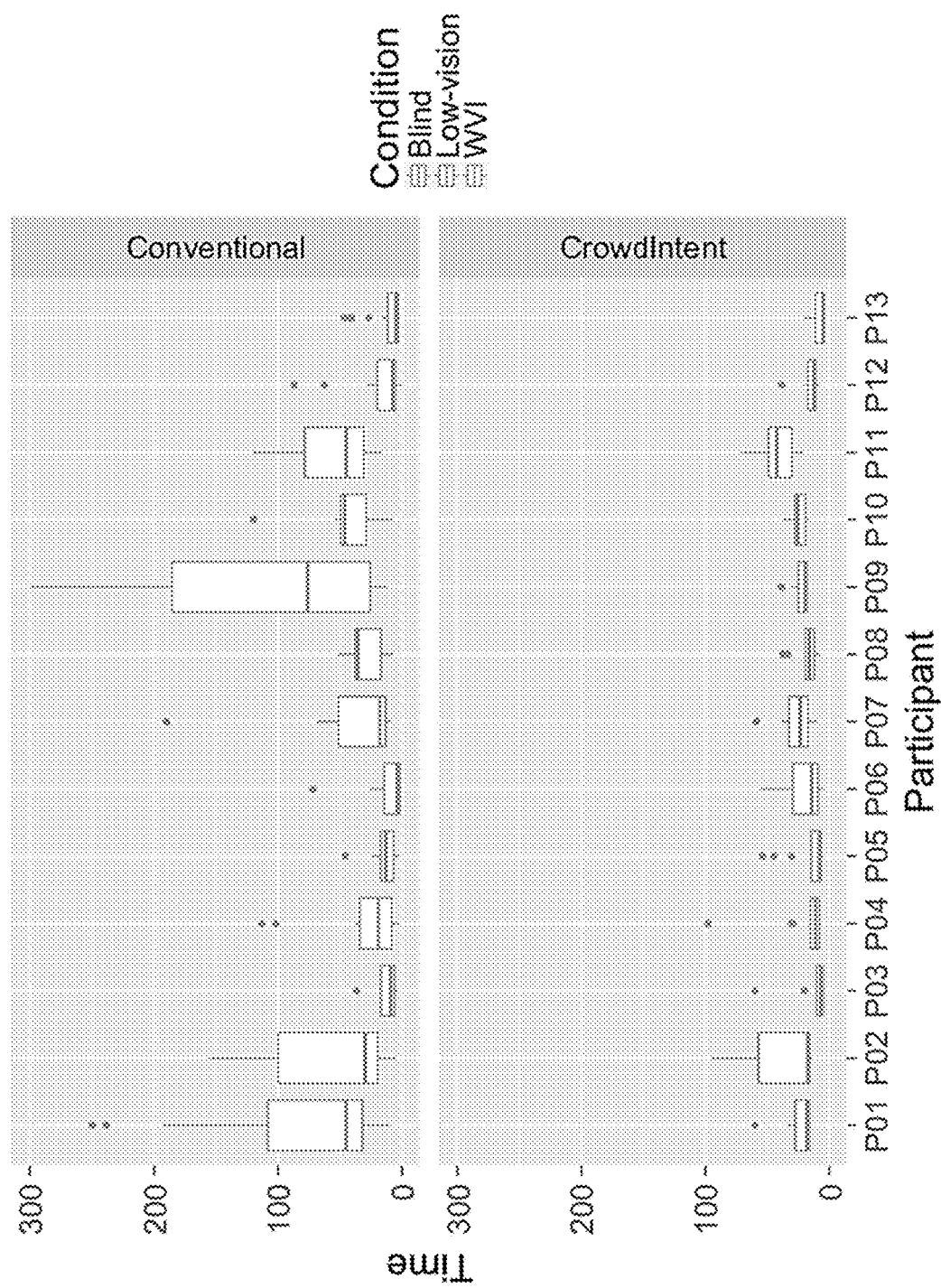
Figure 5:
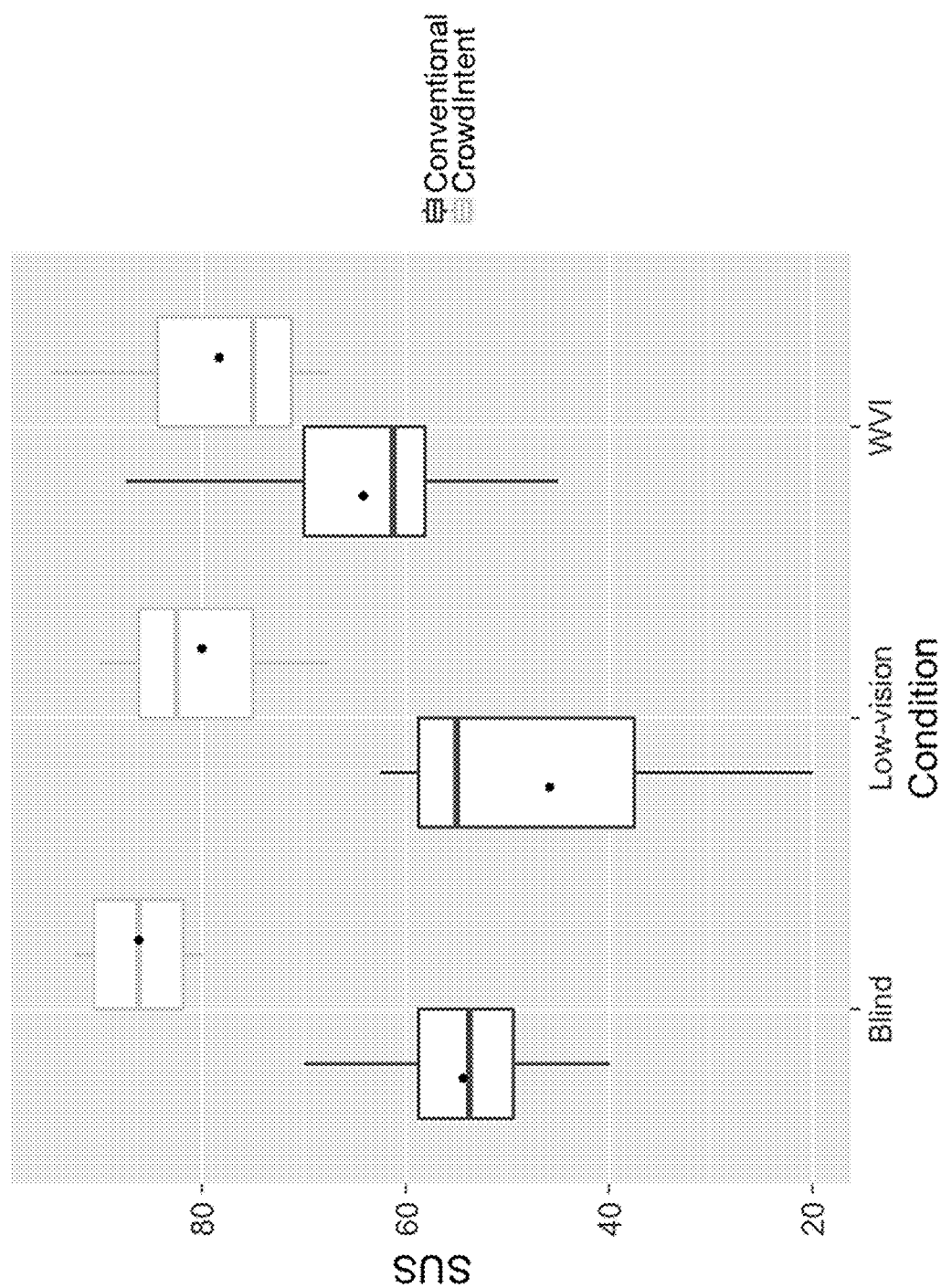

FIG. 4 is a graph of time measurements for all tasks in seconds, where blind and low-vision users took less time to complete tasks with the present invention; and FIG. 5 is a graph of System Usability Scale (SUS) scores given by participant groups where points indicate means and higher scores were given to the present invention, suggesting that participants perceived the present invention as easier to use.

DETAILED DESCRIPTION OF THE INVENTION

Figure 1:
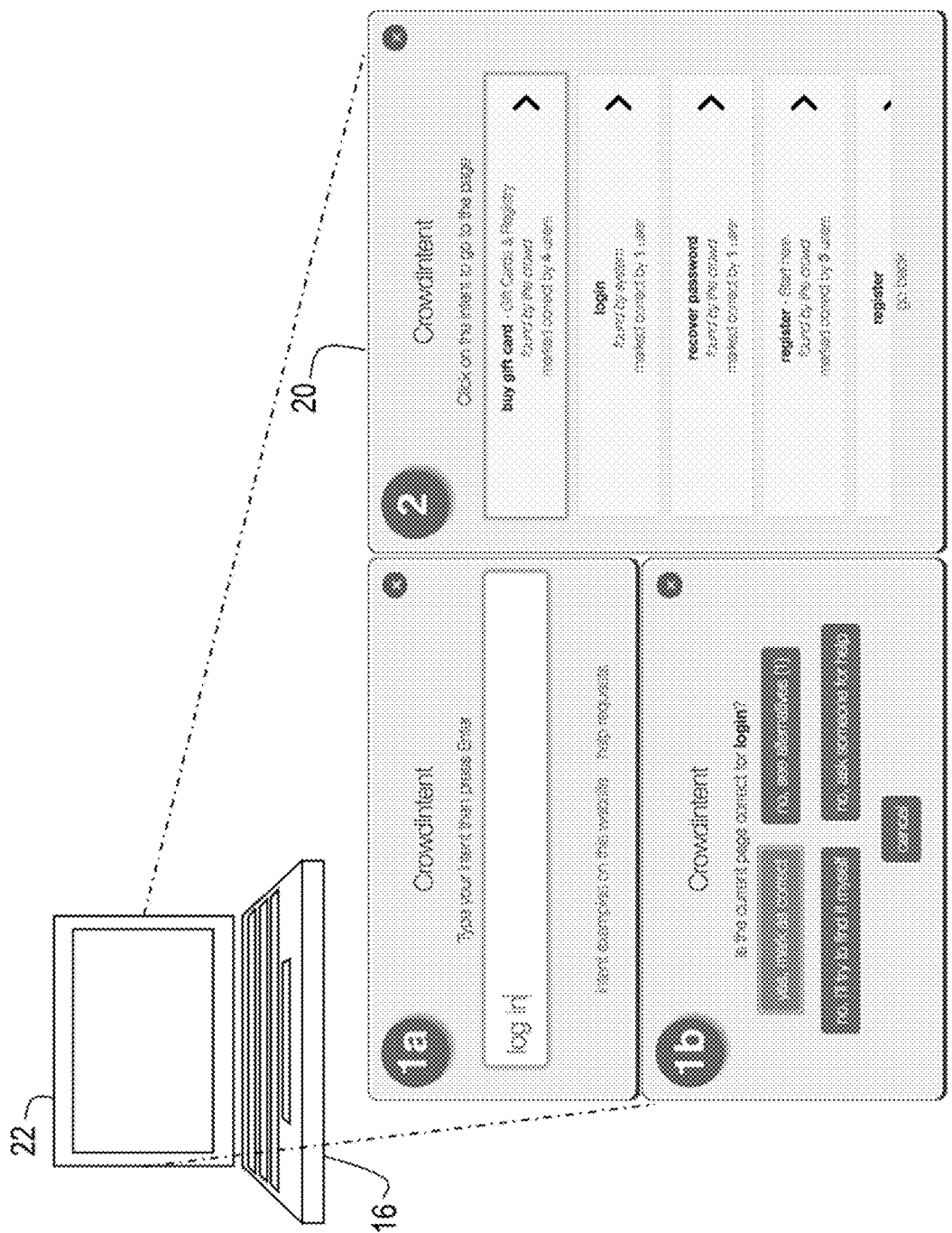
FIG. 1 is a schematic of a user input screens for inputting user intent according to the present invention.

Referring to the figures, wherein like numeral refer to like parts throughout, there is seen in FIG. 1 a user intent based system for allowing users to enter their intents and for performing intent-oriented browsing based on machine learning models and crowdsourcing contributions. The present invention was inspired by universal design, i.e., the idea that designs for people with disabilities could benefit everyone, and was designed with people with visual impairments in mind. Two phases of user evaluation were performed with a total of 29 adults, including 16 with visual impairments (blind or low-vision). Participants with visual impairments preferred using the present invention in general, and participants without visual impairments found the present invention useful for unfamiliar websites, infrequently visited websites and tasks, and/or when dealing with a cluttered website with many links.

The present invention was designed to support intent-oriented browsing within websites. The system was designed with visually impaired users in mind because prior literature suggests considering user goals can greatly benefit web accessibility for these users. The system allows users to directly enter their intents. For example, in order to get to the page to create a new account on a website, a user enters "sign up" as her intent, and the system takes her directly to the page where she can complete the task at hand. The purpose of the system is to help users achieve their goals on the current website, which can be challenging for users with different abilities. For example, completing common tasks (e.g., authentication tasks) across different websites can be daunting for users with visual impairments. In some ways, the system supports navigational and transactional queries without leaving the website. For instance, a user's intent may be to complete a transaction such as "pay bill" or go to the contact page when she is already on the website, then all she must do is to enter her intent into the system, and she would be automatically redirected to the page where she could pay her bill.

As seen in FIG. 1, users can enter one or more intents directly or choose from available intents. As seen in screen 1a of FIG. 1, a user enters intent and then, as seen in screen 1b of FIG. 1, the user is taken to the target page, and asked to mark it as correct, find it manually, or get help from the crowd. As seen in screen 2 of FIG. 1, a list of intent examples on an illustrative Amazon website are provided, showing system-detected target pages and crowd contributions.

Figure 2:
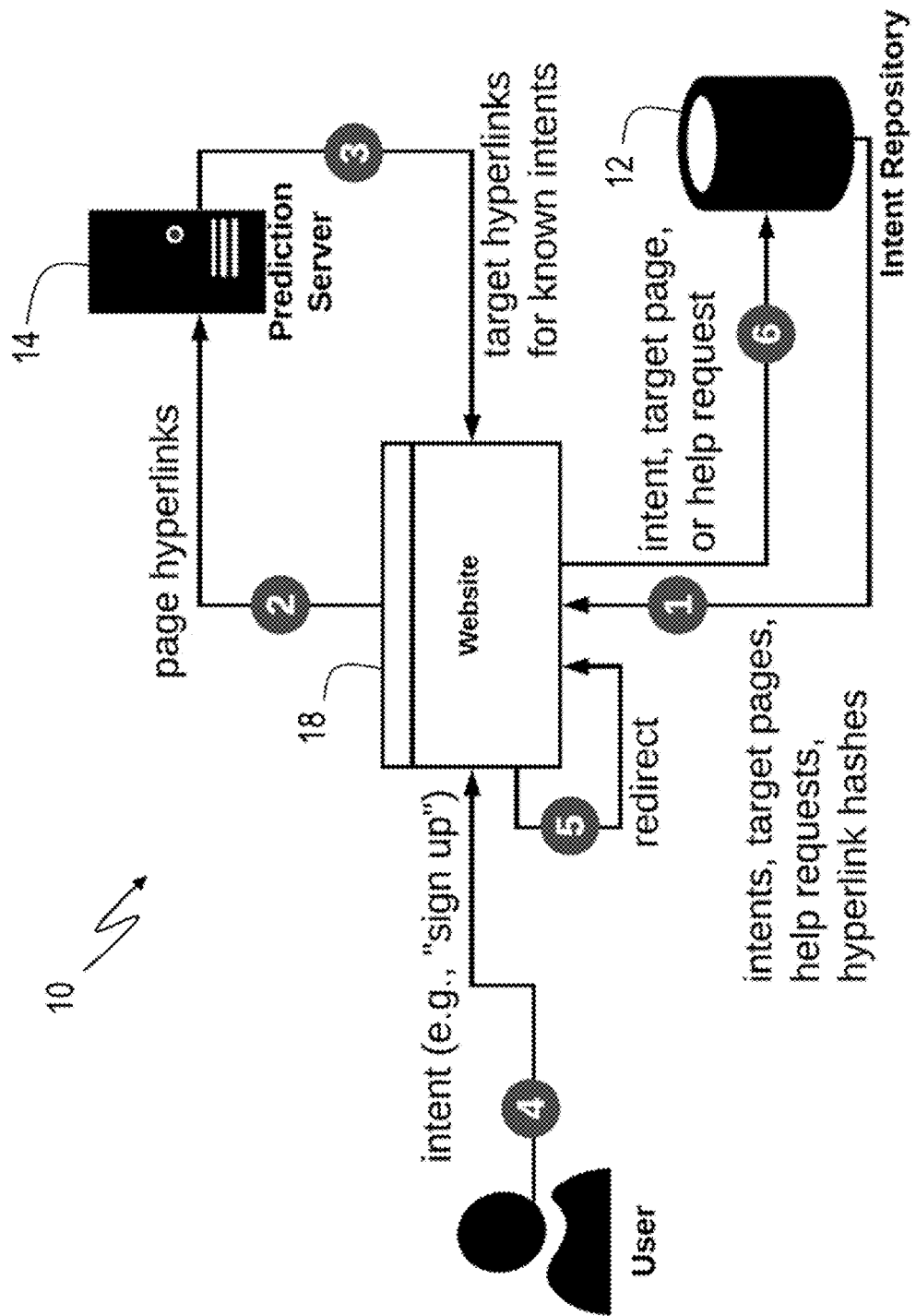
FIG. 2 is a schematic of a system for performing intent-oriented browsing according to the present invention.

Referring to FIG. 2, a system 10 according to the present invention includes an intent repository 12 that has intents (initially supported), target pages, and hyperlink hashes mapped to website domains. Websites are matched in intent repository 12 via domains. Intent repository 12 is thus a physical application server that is programmed with the mapped domains and can return intents (initially supported), target pages, and hyperlink hashes for a particular domain in response to a request. Intent repository 12 receives requests such as to add a new intent and target page to a website, to mark a target page as correct or incorrect, and to send back a list of intents, target pages, and hyperlink hashes for a given domain. Intent repository 12 has basic functions to maintain a database of intents and their associated target pages for each website.

System 10 also includes a prediction server 14 that is programmed to receive hyperlinks from a website 18, i.e., a website server, and return target hyperlinks based on known intent. Website 18 comprises, more specifically, a website server programmed to transmit the web pages to a browser in response to a browser request. Prediction server 14 is programmed to receive requests containing a list of hyperlinks, and to generate responses containing the intent for which hyperlinks map to based upon predictions made from a machine learning model used by prediction server 14. Although the machine learning model was trained previously to make such predictions, models could also be continuously retrained by intent repository 12 when intent repository 14 receives correct or incorrect marks made by users, for example. Prediction server 14 and intent repository 12 are not necessarily connected, but could be if desired.

System 10 further includes a user interface 20 for inputting user intent, such as that seen in FIG. 1. System 10 further includes a browser 22 that is executable on a computer 16 and that is programmed to connect to the intent repository 12 and to the prediction server 14 via a user script. As is known in the art, browser 22 refers to a browser application running on a programmable device, such as a desktop or mobile device, e.g. smart phone or table. Browser 22 may thus be configured to provide user interface 20, but user interface 20 could also be presented by a discrete application.

As illustrated in FIG. 2, the system implements a method that begins with (1) the browser 22 reading a list of intents (initially supported), target pages, and hyperlink hashes from the intent repository 12. Thus, when a page is loaded, browser 22 sends a request to intent repository server 12 that contains the domain of the current website, which intent repository 12 responds to with a list of intents, target pages, and hyperlink hashes that inform browser 22 what intents/commands are readily available to execute for that website. The response from intent repository 22 encompasses all intents, target pages, and hyperlink hashes for the particular domain, not just the current page.

Next, the hyperlink hashes transmitted to browser 22 from intent repository 12 are compared against hashes generated on-the-fly by browser 22 with the hyperlinks on the current page, with the purpose of identifying whether there is already a hyperlink that properly matches to a known intent and target page identified previously (as previously sent by intent repository 12 to browser 22). This is done so that whatever relevant links that are available on the current page and which have been predicted before are not sent out to the prediction server for prediction again, thus saving network resources and making previously known intents readily available to use. Notably, this step could also be performed in the background via crawling the websites and preprocessing the hyperlinks with the prediction server without requiring a user to manually visit a page to get predictions. In other words, in one embodiment, the predictions are made ad-hoc as users visit different pages, but another embodiment could employ crawling in the way that a search engine crawls a website for search results.

Next, (2) browser 22 sends hyperlinks 16 on a current page to prediction server 14. Prediction server 14 will then (3) return target hyperlinks 20 for known intents. Prediction server 14 is programmed to assign an intent (at the lower level the intent is a class from a machine learning classification problem), given a hyperlink. Browser 22 sends all the hyperlinks on the current page to prediction server 14 and get predictions back. Prediction server 14 does not need to have access to the intent repository, and only knows classes which closely match the intents supported by the system. Once the predictions are sent back to browser 22, the intents will be made readily available to use based on the returned response from prediction server 14 that contains each hyperlink and its assigned intent.

Users can then choose from a list of available intents, as given by intent repository 12 and fresh new predictions made by prediction server 14, or enter the intent/command which they wish to complete. Once a user chooses one of the two options, if the prediction matches the user's goal (e.g., the user confirmed that the page was correct), the prediction is transferred from browser 22 to intent repository 12 in order to grow the list of intents and their respective target pages for that particular website. Thus, when a user (4) enters an intent (5), browser 22 will check for a target page or hyperlink. If a new target page or hyperlink is identified, either via machine learning, crowdsourcing or background search (6), the data is sent to intent repository 12 after user is redirected. Intent repository 12 may be programmed to manage help requests.

User Workflow

As soon as a page loads, system 10 starts working in the background to predict target pages based on the hyperlinks on the current page. When pages are predicted, they are assigned to the intents known by the system (initially only the intents for which target pages can be predicted). In order to activate the system, users press a shortcut (e.g., 2× Shift), which prompts users for what they are looking to do (i.e., what their intent is). If there is a predicted target page for the intent the user entered, then the user is taken to the target page. If there is no predicted target page, the user is redirected to the first search result of the background search. Users can mark pages as correct or incorrect for the intent, which is considered later by the system in selecting the target page (e.g., select the page with the most correct marks), thus leveraging the wisdom of the crowd.

System Features

Machine learning is used to predict target pages for the user intent and users can get help with their intents from the crowd. Target pages are predicted by a machine learning model based on hyperlink features. The model can predict target pages for the following intents: "log in," "sign up," "reset password," "contact," "help," "find deals," "browse items," "find popular items," "pricing," "find store," "track order," and "search website" initially supported by the system. When users enter intents that the model cannot predict target pages for (or if the target page was not found), the system performs a background search on DuckDuckGo, redirecting users to the first result matching the keyword for the intent that they entered under the current website's domain (e.g., simulating "I'm feeling lucky"). Google's "I'm feeling lucky" was a possibility, but the redirect would fail too often, resulting in redirecting users to the search results page for their intent. If the page is not correct, users can try to find the page on their own, or request help from the crowd (i.e., other users on the same website). Users can get help from the crowd in real-time, or if no one is online, a list of help requests is kept, allowing requests to be fulfilled later.

System Implementation

FIG. 2 illustrates the system workflow in the system. Once target pages are predicted and marked as correct, they are stored in intent repository 12 and become available for all users who enter the same intent in the future. The initial list of intents the system can support grows as pages are marked as correct for intents entered by users. In the beginning there are only intents supported by machine learning. When users find correct pages through the background search or crowdsourcing, the system creates intents for the user input, e.g., "buy gift card," storing the page assignments for the intent on the website for which the target page was marked as correct. Website changes may cause target pages assigned via crowdsourcing to stop working, but the supervised learning model should be able to detect the new target page, given the intent is supported by the system. Intents are global and span across websites, but target pages are domain-specific. Intents can have synonyms (e.g., "log in," "sign in," "login") and when intents are entered, the intent (or one of its synonyms) with the lowest Jaro-Winkler distance from the input is selected. For example, a working system could be implemented via user scripts that could be added to the user's browser using an extension such as TamperMonkey.

Predicting Target Pages

Machine learning models were built to predict target pages for user intents using features of hyperlinks. Table 1 below describes the features with an example hyperlink. Automated exhaustive searches were performed to identify the best hyperlink features for the model. The position feature was added to capture design heuristics such as showing website-wide hyperlinks at the top or at the bottom of the pages.

TABLE 1

| \<ahref="https://craigslist.org/login/home"\>my account\</a\> | | |
| --- | --- | --- |
| Feature | Example | Transformation |
| text | my account | matrix of token occurrences in hyperlink's inner text |
| context | post to classifieds my account | tf-idf matrix of hyperlink grandparent's inner text |
| position | 1.873628657 | the element's relative index in the document tree (%) |
| length | 10 | # chars of the inner text |
| url words | log in home | tf-idf matrix of URL work segmentation |

Classification Unit

To map pages to intents, inspiration was drawn from prior work on retrieving answer pages for transactional search queries and genre classification of web pages. Hyperlink features are good indicators of what transactions the target page can support and web page genre can assist users in goal-directed browsing as well as in improving effectiveness of web search. Moreover, structural information (e.g., URL, anchor text, nearby text) can help improve entry page search and link-based page classification. With fast link-based classification of pages surpassing accuracy of content-based classification, hyperlinks are practical indicators of target pages for user intents because the system would not have to parse potential target pages, but only consider website hyperlinks instead. Therefore, the classification of navigational and transactional pages based on features of hyperlinks leading to the target page was used for an intent. This means classification involves classifying hyperlinks leading to target pages that can fulfill the user's intent. In order to obtain a training dataset, methodologies used in genre classification of web pages were employed except, unlike prior work in the field, origin hyperlinks were labelled instead of pages, although users were still shown the rendering of the target page originating from a click on the respective hyperlink when manually labeling samples. The dataset contains weakly labeled data obtained through distant supervision (not done before in web genre labeling) and manually labeled data. Distant supervision consists of using heuristics to "weakly" label a training set. This approach would allow us to obtain many training samples without prohibitive costs. The target classes are "login," "register," "recover password," "help," "faq," "contact," "find deals," "browse items," "find popular items," "pricing," "find store," "track order," "search website," and "other."

Distant Supervision

A stratified sample of 3,000 websites was first extracted from Alexa's list of top 1 million websites in October 2016. 1,000 websites were selected from the top of the list, 1,000 from the bottom, and 1,000 random websites between the 1,001st and 999,999th website, inclusive. Any websites that were not ".com" were then removed to filter out most non-English websites. Finally, because a random sample of the data in the future would be manually labeled based on images, a blacklist was used to remove any websites with adult and violent content. In the end, the website sample had 1,486 websites.

Heuristics were then defined for distant supervision by visiting the top 100 websites on Alexa's Top 1 Million list manually and extracting the inner text of hyperlinks leading to the target pages of interest. For example, for the "login" class, keywords such as "sign in," "log in," "login," "dashboard," and "my account" were used. After gathering the heuristics, web scraper built with Scrapy and Splash was used to visit the websites from the stratified sample of top websites according to Alexa, and collect the hyperlink features of the elements matching the keywords of the target classes, labeling them automatically as belonging to the respective target class. Screenshots from the state of the page immediately after the hyperlink was clicked were collected, assigning the screenshot to the sample. For every website, up to five hyperlinks belonging to the "other" class were collected (i.e., hyperlinks not belonging to any of the other target classes according to heuristics). This process resulted in the weak-labeling of 6,355 hyperlinks.

Manual Labeling

From the weakly labeled dataset, a random sample of 688 authentication-related hyperlinks and a random sample of 688 hyperlinks not related to authentication for manual labeling were selected. In each sample, 50% of the samples belonging to the "other" class were included, as labeled by the web scraper. A separate crowdsourcing experiment was conducted on Amazon Mechanical Turk (AMT) for each sample. This was so that crowd workers would not be overwhelmed with the many options for each page they had to label. A Human Intelligence Task (HIT) consisting of labeling 10 pages was set up. In addition to being required to have over 95% all-time approval rates, crowd workers completed a qualification task in which they saw four examples and labeled training samples for which they were required get seven out of 10 pages correct before they could label the actual pages.

Labeling a page consisted of seeing a screenshot and choosing from a multiple choice question what type of page (i.e., the target classes) users thought that to be, giving their confidence level ranging from one to five, and entering the major reasons behind their decision into a text field. Recommendations set forth by prior work on user-based labeling of web genres were followed. Each hyperlink was labeled by five different crowd workers, taking the majority vote as the true class, and crowd workers were allowed to assign multiple classes to each page, but these were removed from the dataset because there were fewer than 10 belonging to multiple target classes after majority voting. These experiments were conducted following a successful pilot labeling experiment of 96 authentication-related hyperlinks on AMT.

A total of 774 unique crowd workers participated in the labeling experiments, they were paid $0.04 (USD) per labeled page, with a total of $0.80 (USD) per task, which consisted of 10 qualification pages and 10 actual pages. The inter-coder reliability score (Fleiss Kappa) was 0.853 for authentication-related pages, and 0.766 for pages un-related to authentication (i.e., help and contact). These scores are considered acceptable agreement.

For the remaining tasks, namely "find deals," "browse items," "find popular items," "pricing," "find store," "track order," and "search website," we labeled hyperlinks using distant supervision alone (i.e., by scraping and using heuristics), based on a heuristics obtained from categories of most popular websites on http://similarweb.com. In the end, a dataset of 9,499 hyperlinks was obtained, with 1,454 being manually labeled and 8,045 weakly labeled.

Machine Learning Models.

Three models were created, one for authentication-related pages, another for "help" and "contact" pages, and a third for the various tasks related to categories of websites (e.g., track order, pricing, find store) based on a Support Vector Machine (SVM) classifier with linear kernel, combining all of the data obtained through distant supervision and manual labeling. In the system, the "get help" intent was mapped to target pages classified as "help" or "faq." This was done to keep intents more transactional rather than informational. Three models were created because the manual labeling and scraping experiments were conducted separately, so in the experiment with the "help" pages, there could be "login" pages marked as "other", which would confuse a single model. Table 2 shows the evaluation of the models. The model is able to predict pages for the "recover password" (F1=0.92) and "contact" (F1=0.95) intents most accurately, while making more mistakes on "register" (F1=0.82) and "help" (F1=0.74) hyperlinks. The model performed best when trained with both data obtained through distant supervision and manual labeling. The model was created with Scikit-learn and used it in the backend (i.e., a Python web app) of the browser extension.

TABLE 2

| | Authentication-reisted intents | | | | | | | | | Other intents | | | | | | | |
|---|---|---|---|---|---|---|---|---|---|---|---|---|---|---|---|---|---|
| | 10-fold CV | | | | ~20% hold-out set | | | | | 10-fold CV | | | | ~20% hold-out set | | | |
| | P | R | F1 | # | P | R | F1 | # | | P | R | F1 | # | P | R | F1 | # |
| login | .87 | .91 | .89 | 368 | .86 | .82 | .84 | 22 | contact | .95 | .95 | .95 | 411 | .92 | .89 | .91 | 38 |
| other | .98 | .97 | .97 | 3641 | .88 | .93 | .90 | 85 | faq | .87 | .86 | .86 | 133 | .93 | .81 | .87 | 16 |
| recover password | .87 | .94 | .90 | 244 | .94 | .89 | .92 | 19 | help | .76 | .73 | .74 | 169 | .74 | .88 | .80 | 16 |

TABLE 2-continued

| | Authentication-reisted intents | | | | | | | | Other intents | | | | | | | |
|---|---|---|---|---|---|---|---|---|---|---|---|---|---|---|---|---|
| | 10-fold CV | | | | ~20% hold-out set | | | | | 10-fold CV | | | | ~20% hold-out set | | |
| | P | R | F1 | # | P | R | F1 | # | | P | R | F1 | # | P | R | F1 | # |
| register | .82 | .83 | .82 | 368 | .90 | .79 | .84 | 24 | other | .99 | .99 | .99 | 3547 | .94 | .94 | .94 | 80 |
| CV mean | .949 | | | 4621 | | | | 150 | CV mean | .97 | | | 4260 | | | | 150 |

In predicting hyperlinks in real-time, the bottleneck was the word segmentation algorithm when it had to deal with query string values such as "&pf_rd_r=MN30C7K3CER2BJNK1V72," therefore query string values from word segmentation were excluded, considering only URL path components and query string keys for the url words feature. The system also sends hyperlinks for prediction in three batches, with the first batch being a third of hyperlinks from the top, the second being a third from the bottom, and the third being the ones in between. In doing so, target pages are available more quickly since the website-related hyperlinks are likely at the top or at the bottom, with page content in the middle.

Crowdsourcing

To mitigate user frustration when machine learning does not work, human intelligence was incorporated into the system via crowdsourcing contributions, which takes place in two ways: through help requests and target page marks, as described below.

Help Requests

Users can explicitly ask for help when they think the target page is not correct for the intent they entered. If there are other users online on the same website (using the system), they receive a notification saying "someone needs help finding the page for [user's entered intent]." If a user on the receiving side of the notification chooses to help, she must find the target page on the website and mark the page as correct entered intent]," and asking the user if she wants to visit the page, taking the requester to the page found by the helper. Unfulfilled requests for help can also be seen on the "help requests" screen, through which helpers can take on new requests. When a user chooses to help a requester, the requester receives a notification saying "someone is trying to help you find the page for [user's intent]." Any user who opts-in to receive help requests for the current website receives a notification when others need help.

Target Page Marks

When users enter intents into the system, they are taken directly to the target page based on the system prediction or the background search result. If the page is correct, users will mark it as correct. If not, users can try to find the page manually, or get help from the crowd. In the former case, the user marking will be considered when intents are entered in the future by any user (including themselves) and the target page with the highest correct marks is selected. In the latter case (when it's not correct), the target page is moved down the list of intent examples because it was marked as incorrect before, with highest correct marks moving to the top of the list within the alphabetical order of intents. In addition, when target pages are marked as correct, a hash of the hyperlink or the actual page URL (if a hyperlink isn't available, e.g., found manually or via web search) are stored in the database, so in the future hyperlinks matching the hash for the target page no longer need to be sent out to the server for prediction, avoiding unnecessary network traffic and computation User Evaluations Iterative Design and Evaluation the system was designed and evaluated in an iterative fashion including two phases. Phase 1 and Phase 2 took place between August and November 2016 and August and November of 2017, respectively. In Phase 1, resembling a Wizard-of-Oz approach, the aim was understanding acceptance and perceptions of intent-oriented browsing (e.g., the interaction modality) as well as the need for such an approach by hard-coding intents to target pages related to authentication. In Phase 2, building upon the Phase 1 results, prediction of target pages was implemented via machine learning and crowdsourcing contributions. An evaluation was conducted of the overall system performance supporting more intents. Additionally, in Phase 2, follow-up sessions were conducted with participants to compare the system with search engines (e.g., Google, Bing).

User Study Design

The within-subject study involved participants completing several tasks on a number of websites using the system and their conventional browsing mechanisms (without the system), which was referred to as methods. The order in which these two methods were tested was counterbalanced. Odd-numbered participants tested the conventional method first, while even-numbered participants tested the system first. Participants included blind users, users with low vision, and users without visual impairments. Participants were compensated with $30 (USD) for a session lasting approximately two hours at the participant's preferred location (e.g., their home, workplace, or the testing lab).

Participants were encouraged to use their own computer in order to strengthen the ecological validity of the evaluation (i.e., participants used their usual computer, operating system, browser, and assistive technology). Otherwise, a laptop was provided with popular assistive technology software (e.g., ZoomText, JAWS) and browsers (e.g., Chrome, Firefox, Internet Explorer) for participants to use. In Phase 1, follow-up sessions were conducted within one-to-three weeks of the first session aiming at understanding the effect of user retention and familiarity with the system on usability and completion times. Follow-up sessions were not conducted in Phase 2 because significant changes were not found during Phase 1's follow up sessions. Audio and video was used to record the sessions with permission from participants. The study was approved by the IRB.

Participant Recruitment

Participants were recruited from prior studies involving users with visual impairments, and from new participants via email, phone, Craigslist ads, using mailing lists of local organizations serving people with visual impairments, and encouraging participants to refer more prospective participants to us via snowball sampling. 14 participants were recruited in Phase 1 and 13 participants in Phase 2. In Phase 1, three blind users were recruited, four with low vision, and seven without visual impairments for both the first and the follow-up sessions. In Phase 2, four blind users were recruited, three with low vision, and six without visual impairments. The average age of participants was 44.04 (M=45, SD=17.68, Min=19, Max=72). Participants were from diverse backgrounds including student, consultant, retired teacher, economic development, production worker, IT consultant, and unemployed. Participants who self-described as low vision have described a variety of conditions, including Myopia (nearsightedness), astigmatism, presbyopia, amblyopia, visual-motor integration (visual processing/spatial awareness), chronic vertigo, bilateral coloboma of the iris and retina, and cerebral palsy with legal blindness in one eye. Across both phases, 27 participants were recruited, of which 14 are visually impaired and 13 are not (see Table 3 for more details).

TABLE 3

| Phase 1: Exploring the Interaction Modality | | | | | | |
|---|---|---|---|---|---|---|
| ID | Sex | Age | Ability | Assistive Tech. | Preference S1 | Preference S2 |
| P1 | M | 60 | LV | None | X | X |
| P2 | M | 70 | B | VoiceOver | X | X |
| P3 | F | 45 | B | JAWS | X | X |
| P4 | F | 19 | LV | None | X | X |
| P5 | M | 25 | LV | None | X | X |
| P6 | F | 52 | LV | None | X | X |
| P7 | M | 34 | WVI | None | O | O |
| P8 | M | 33 | B | JAWS | X | X |
| P9 | M | 25 | WVI | None | O | O |
| P10 | F | 24 | WVI | None | — | X |
| P11 | M | 26 | WVI | None | — | — |
| P12 | F | 61 | WVI | None | X | X |
| P13 | M | 72 | WVI | None | X | X |
| P14 | F | 56 | WVI | None | X | X |

| Phase 2: Enabling Intent-Oriented Browsing | | | | | |
|---|---|---|---|---|---|
| ID | Sex | Age | Ability | Assistive Tech. | Preference |
| P1 | M | 35 | B | JAWS, NVDA | X |
| P2 | F | 56 | LV | ZoomText | X |
| P3 | F | 65 | WVI | None | X |
| P4 | M | 72 | WVI | None | O |
| P5 | F | 26 | WVI | None | X |
| P6 | F | 22 | WVI | Magnifier | O |
| P7 | F | 53 | LV | OS settings | O |
| P8 | F | 47 | B | JAWS | X |
| P9 | M | 45 | B | JAWS | X |
| P10 | M | 42 | B | JAWS, NVDA | X |
| P11 | M | 70 | LV | ZoomText | X |
| P12 | M | 30 | WVI | None | X |
| P13 | M | 24 | WVI | None | X |

Study Procedure

Each session was started with participants completing three training tasks for each method on a familiar website in order to allow them to get acquainted with the methods. Participants could ask questions and then continued the study once they confirmed reasonable understanding of the methods.

Having completed the training portion, the actual study tasks followed, which consisted of using the system and conventional browsing to complete several tasks on websites. In Phase 1, participants used three websites of their choice to complete authentication-related tasks (e.g., log in, sign up, change password), for which the target pages were hard-coded for the intents. Differently, in Phase 2, participants used four websites, of which they picked three (two familiar, one unfamiliar), with the fourth being a fixed website chosen to pose as an unfamiliar website (a Department of Motor Vehicles—DMV website from a US state). The intent repository was cleaned up before every session so it would be the same for all users.

In both phases, the baseline "conventional" method consisted of having users go to the website's homepage and start the tasks from there, and the same applied to the system—except that participants could use the system. The baseline method was not web search (e.g., Google) because prior work showed that visually impaired users have great difficulty navigating search engines and search results, so the intent was to compare the system with a baseline that reflected the websites themselves, not the search engine's user interface. Indirectly, the website design will affect how search engines index and present the page, so when websites are designed to support high-level user goals, that will also impact search engine results. In addition, visually impaired users make use of bookmarks and browser history to guide their navigation, which can also become a challenge when websites change frequently. For these reasons, we decided to use the baseline method as navigating the website itself. Nevertheless, participants were allowed to use search engines within the website, if available. However, in the follow-up session of Phase 2, participants were allowed to use search engines when testing the conventional method, being required to do so for two websites.

Unlike Phase 1 where hard-coded target pages were used for intents, in Phase 2 the supervised learning models and crowdsourcing contributions were used to assign target pages while also using background search as a fallback mechanism, involving authentication tasks and tasks beyond authentication (e.g., contact, help, buy gift card), with some intents being website-specific (e.g., make appointment with the DMV), and other tasks of their own choosing (e.g., find nearby stores on supermarket chain website). Most tasks tested were those supported by the system's machine learning models (e.g., authentication tasks). The reason these tasks were chosen is twofold. First, visually impaired users have great difficulty performing authentication tasks on websites, especially in finding pages that meet their authentication goals (e.g., log in, sign up). Second, these tasks are present in most websites, so there was an opportunity to test the interaction modality (i.e., intent-oriented browsing) on supportive tasks across websites. While it was not in the scope of the work to support more complex, multi-stage intents (e.g., planning a vacation), how this could work later is considered herein. The intention was to evaluate the interaction modality with simple intents first, thus yielding insights for more sophisticated scenarios.

Participants of Phase 2 also completed two tasks involving crowdsourcing, one being the requester and the other being the provider. The crowd was simulated when the tasks involved the crowdsourcing feature. In Phase 1, participants used the system via a browser bookmarklet, and in the Phase 2 they used it as a user script installed on the browser. Following the tasks with each method, participants completed a System Usability Scale (SUS) questionnaire about the tested method. After working through tasks with both methods, participants answered exit interview questions aimed at capturing participant's acceptance, preferences, and perceptions of the system (e.g., "which browsing mechanism do you prefer and why?" "what tasks did you find the system most useful for?" and "when did you find the system to be rather unnecessary?"). In Phase 2, questions were included about preferences on target page identification (e.g., system versus crowd) as well as individual questions about any individual behavior that stood out. The ultimate goal was not to use the system as a benchmark, but rather to understand how intent-oriented browsing can take place on websites and when it can be most useful.

Data Analysis

In Phase 2, back-end logs were instrumented for intents entered, tasks completed, target page identification mechanisms used (e.g., predicted, crowd, or background search), among other interactions, using the logs and the video recordings to measure completion times. In both phases, audio and conducted iterative thematic analyses of the qualitative data was transcribed, with two coders independently coding a subset of the data at sentence level, then discussing and converging 21 codes into a code book used for the remaining of the transcriptions.

Results

Throughout the present disclosure, B refers to blind participants, LV refers to participants with low vision, and WVI refers to participants without visual impairments.

Phase 1: Proof of Concept

In Phase 1, the study sessions showed that intent-oriented browsing was a desirable feature whose main advantage is providing a layer of consistency across websites so that users do not have to deal with individual differences of each website design, taking users directly to where they wanted to be in order to complete the task at hand. For instance, P5 (LV) noted "well, I don't have to think about how it works each time. If I know it's going to work with the sites that I use, I don't have to rely on my intuition and using everyone's different interface." Intent-oriented browsing was also more desirable by users with visual impairments, but users without visual impairments would use it as a fallback mechanism when they were visiting unfamiliar websites or completing infrequent tasks. For example, P12 (WVI) noted "only if login is the criteria, then I can go with any of the methods. But if you asked me to change my password [ . . . ], then I would prefer the system which you installed." After the follow-up session, the majority of participants (11 out of 14) preferred the system over using conventional browsing, with the system being preferred by six out of the seven visually impaired users. Participants wished that the system worked on different websites, supported more intents, and allowed custom intents for websites (e.g., "edit social media profile" on social media websites, "change payment methods" on shopping websites). For example, P12 (WVI) commented "Like, something can be basic, like, for example change picture. So, if I want to change or update my picture or, like in Amazon I just want to go and see my card or I just want to go and see my particular list, wish list. So I can just type in this and I can directly go. So, still similarities can be seen of basic commands in all these websites. Plus, customization can also be done as for a particular website." A generalized linear mixed effects model test (Method as fixed, Participant, Task, and Condition as random) showed comparable task completion times between the two methods ($\chi 2(1, N=392)=3.71$, $p=0.054$). Within groups (removing Condition), blind and low-vision users took significantly less time to complete tasks with the system: $\chi 2(1, N=84)=62.12$, $p<0.001$ and $\chi 2(1, N=112)=5.14$, $p<0.05$, respectively, but completion times were comparable for users without visual impairments ($\chi 2(1, N=196)=0.65$, $p=0.421$). Wilcoxon signed-rank tests showed comparable SUS scores in the first session for both methods ($Z=0.60$, $p=0.575$), but higher for the system in the follow-up ($Z=2.26$, $p<0.05$).

System Usage

The Phase 2 prototype was instrumented with system logs, tracking the usage and performance of the system (e.g., intents entered, websites used, target pages predicted, etc.). The system logs were combined with data from the video recordings to measure time for both the system and conventional browsing.

Websites and Intents.

28 unique websites were used, including, shopping websites (e.g., ebay.com, fovever21.com), file sharing websites (e.g., dropbox.com, mega.nz), news websites (e.g., nytimes.com, bbc.com), bank websites (e.g., mtb.com, citizensbank.com), and marketing websites (e.g., constantcontact.com, shopify.com). A total of 205 intents were logged, with a total of 42 unique intents. Intents entered included common intents across websites such as "log in" and "sign up" as well as website-specific intents such as "get coupons" on a supermarket website, "buy gift card" on a shopping website, and "listen to radio" on a news website.

Target Page Identification.

Figure 3A:
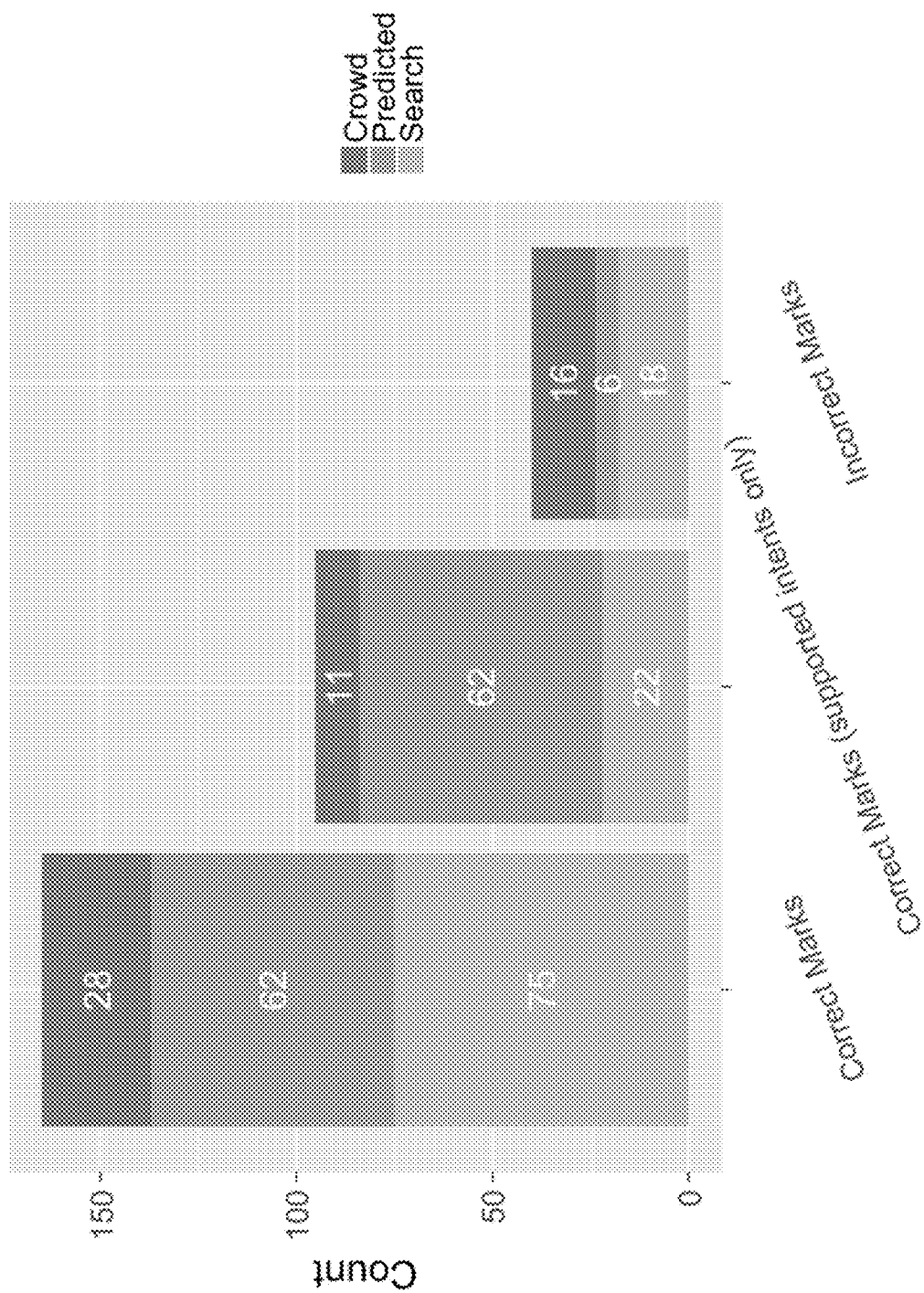
FIG. 3A is a graph of usage summary of the present invention by correct and incorrect marks by source.
Figure 3B:
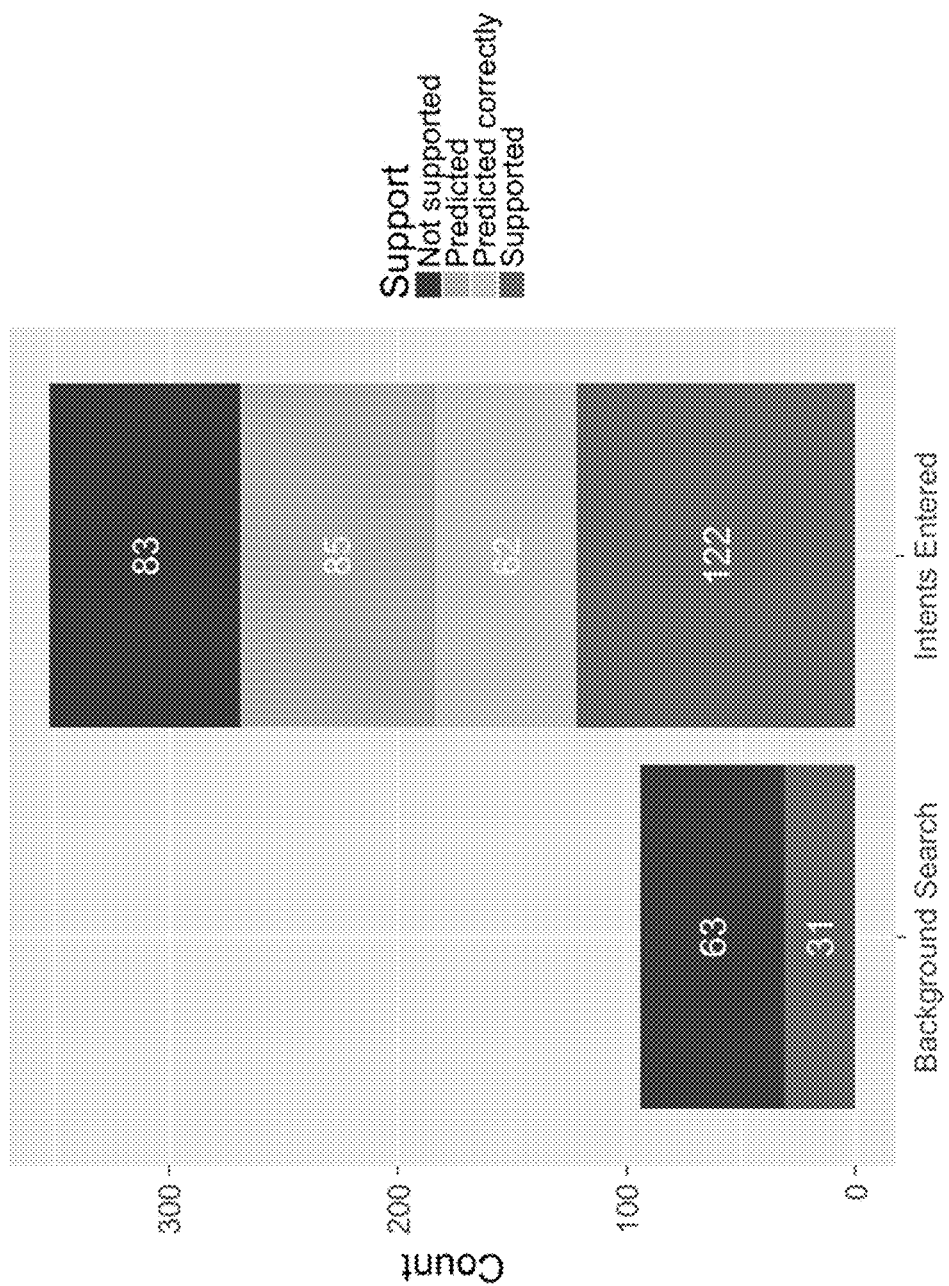
FIG. 3B is a graph by intents entered and background search queries performed.

From all 205 intents entered, the system could have supported 122 (59.5%) via machine learning, for which the system predicted 85 target pages (69.7% of 122, i.e., the recall), with 62 target pages getting marked as correct by participants (72.9%, i.e., the precision). This number excludes instances where users forgot to mark page as correct (simply closing the dialog) and cases where users were taken to a different domain, since system logs were not able to count those instances. The number of correct marks logged by users was 165 (80.5% of all entered intents), of which 37.6% (62) were predicted by the system, 17% (28) came from the crowd, and 45.5% (75) came from the background search. Nonetheless, 70.7% (53) of correct marks from the background search do not belong in the group of intents supported by machine learning (i.e., the background search was only used for intents not initially supported by the system). For the intents supported by machine learning (e.g., log in, sign up), a total of 95 target pages were marked as correct, with 65.3% (62) being predicted by the system, 23.2% (22) coming from search, and 11.6% (11) from the crowd. The total number of background search queries performed was 94, with 33% (31) being search for intents supported by machine learning (e.g., log in, sign up). In other words, the majority of entered intents that could have been supported by the system were indeed supported by the system, without having to resort to background search. In addition, participants marked target pages as incorrect 40 times, with 18 of those being pages identified by the background search, six by the system, and 16 by the crowd. Most incorrect marks resulting from background search consisted of content mixup, where the search engine would return a page matching the intent keyword rather than matching to user goals. FIG. 3 summarizes system usage in Phase 2.

Task Times

On average, blind participants took less time to complete tasks with the system compared with the conventional browsing. Table 4 and FIG. 5 summarize completion times, showing all participant groups took the shortest time to complete tasks with the system. A generalized linear mixed effects model considering Method (e.g., the system versus conventional) as fixed effect and Participant, Task, and Condition as random effects showed a statistically significant effect of Method ($\chi 2(1, N=356)=16.44$, $p<0.001$). When analyzing within groups using the same effects (except the Condition), a statistically significant effect of Method was observed for blind participants ($\chi 2(1, N=98)=50.51$, $p<0.001$), which is consistent with Phase 1, as well as for users with low vision ($\chi 2(1, N=72)=4.15$, $p<0.05$), but not for users without visual impairments ($\chi 2(1, N=152)=0.01$, $p=0.916$). In the time measurements for the system, the time waiting for the confirmation prompt is included, which took from two to 10 seconds, depending on the participant's preferences. The delay accommodated individual participants, since screen reader users took more time to determine whether the page was correct whereas users without visual impairments would find the delay unnecessary when quickly identifying the page. In addition, participants with visual impairments had a hard time in the conventional method even when using search engines: the average time spent only to find the website when using search engines was 90.9 seconds for blind participants (Mdn=60.6, SD=119), 36.5 seconds for participants with low vision (Mdn=23, SD=36.2), and 20.9 seconds for those without visual impairments (Mdn=18, SD=16.7).

TABLE 4

| | CrowdIntent | | | Conventional | | |
|---|---|---|---|---|---|---|
| | Mean | Median | Standard Dev. | Mean | Median | Standard Dev. |
| All | 22.7 | 18 | 18.16 | 38.89 | 19 | 52.83 |
| Blind | 22.12 | 19 | 9.38 | 68.8 | 43.5 | 73.95 |
| Low vision | 35.16 | 30 | 22.22 | 51.51 | 34 | 46.53 |
| WVI | 16.12 | 9.5 | 17.07 | 16.36 | 8.5 | 21.41 |

System Usability

The average SUS score given to the system by all participants was 81.15 (M=82.5, SD=9.55) and 56.92 to the conventional method (M=57.5, SD=16.43). Consistent with the follow-up session in Phase 1, a dependent Wilcoxon signed-rank test suggests the system was deemed more usable with significantly higher SUS scores than the conventional method (Z=−3.15 p<0.001). Among blind participants, the mean SUS score for the system was 86.25 (M=82.25, SD=5.95), 80 (M=82.5, SD=11.46) for users with low vision, and 78.33 (M=78.33, SD=10.68) for users without visual impairments. For the conventional method, the average score of blind participants was 54.38 (M=53.75, SD=12.31), 45.83 (M=55, SD=22.68) for low vision, and 64.17 (M=61.25, SD=14.46) for users without visual impairments. FIG. 5 shows a summary of SUS scores by participant group.

User Preferences

When asked which method participants preferred, in Phase 1, nine out of 14 participants preferred the system in the first session (Blind=2, Low-Vision=4, Without-Visual-Impairments=3), while 11 out of 14 preferred the system in the follow-up (B=3, LV=4, WVI=4). In Phase 2, ten out of 13 participants (B=4, LV=2, WVI=4) preferred the system, and three (B=0, LV=1, WVI=2) preferred the conventional method.

Why the Present Invention?

Being taken directly to the target page without having to deal with inconsistencies across websites or getting familiar with them was the main reason why participants preferred the system, with 11 participants mentioning it in Phase 1, and six in Phase 2. For example, P2 (LV) noted she preferred the system because "it sent me right to where I wanted to go instead of having to navigate a system that was cumbersome."

Pros of the System.

In Phase 1, the major perceived advantages of the system given by all participant groups were that it was easy to use (eight participants) and straightforward/direct (eight participants), with consistent results in Phase 2: major perceived advantages of the system were that it is easy and direct (eight participants). However, an additional perceived major advantage of the system in Phase 2 was the ability to get help (five participants).

Straightforward and direct P9 (B), noted "it's a matter of just typing in the topics you want, for example if you have to sign out sign in and type in whatever you want and it takes [you] to the page easily." He added the system is "like a search engine. It's like Google." P9 was asked if he could complete the tasks with Google. He replied "'Google tells you where you have to go. Leaving the website is inconvenient. While I'm on that website I don't think I can use Google." P9's comment was also echoed by P13 (WVI) who noted "you don't have to browse through multiple pages, to reach one page, it's going to take you there." Help feature Five participants noted one perceived advantage in the system is the ability to ask someone for help, although they could grow impatient while waiting for it. For example, P7 (LV) stated "that is definitely a pro, being able to have the help of other people [ . . . ] but what if no other user was online?" P3 (WVI) echoed P7's concern saying that she would not use the help feature that much because she is impatient, but noted it could work well within affinity groups (e.g., at work). She noted "within your office for example, then it would work. Because if everybody's using it then instead of walking down the hall I could just [use the system]. That makes a lot of sense I could actually see this working well within a project." P8 (B) made similar comments, highlighting that she would find the crowdsourcing more useful if she could use it with people who may know her, saying "strangers don't know you and your habits and the things you are interested in." She made this comment following a request for help to "buy braille papers."

Automatic or Crowd?

Participants pointed out they would prefer the system to take them to the target pages over the crowd because they trust the system to find the correct target pages and because they want to be independent. Participants were concerned that the crowd would not be able to understand their intent and that it would take too long for them to get help. For example, P5 (WVI) noted "I would probably prefer the system, I would trust that more, because it's me telling the prompts what I'm looking for versus another person who may not exactly [know] what I'm looking for unless they were using the exact same search term." For this reason P1 (B) and P7 (LV) wished the system would allow users to chat back and forth. Nevertheless, target page markings were deemed useful by participants, with P8 adding that it would be a "way of seeing how other people have dealt with things" and that it "sounds like the results from the other people's visits to the same website, and you know, that could be useful," referring to the list of intent examples. Her comments were echoed by P10 (B) when he said "I like how if it doesn't find what you want you can go to a list of pages that people have searched for cause it might even give you some other ideas of where you want to go."

Perceived Cons of the System

Most perceived disadvantages of the system in Phase 1 were related to the limitations of the prototype, such as bookmarklet activation (even though the bookmarklet was activated for participants) and lack of universal website integration (e.g., work on more websites and with more intents). In Phase 2, participants mentioned some cons such as having content mix up with the intent (three), waiting for system prompts (five, all WVI), and privacy concerns (five).

Content mixup. P5 (WVI) said "as far as cons, it can be very misled, such as on the news site, if I was searching for a certain term, it would pull up hits from a news item with that not the page." She was referring to an instance where she tried "find downtown news" on a local news website and the background search led her to a news piece matching the keywords she had typed.

Interrupting prompts. Five participants without visual impairments perceived confirmation prompts as interrupting. P5 (WVI) noted "waiting for that prompt afterwards to say it was correct or was it not. I often forgot; normally I'm so quick about what I want to do next."

Privacy concerns. Five participants also raised privacy concerns about the help requests. For instance, P3 (WVI) noted "[ ... ] I don't know if that makes me anxious or not that I just joined this community that you know is the security there I guess? If I get help from someone do they know who I am? Is there any way they could hack me?" P9 (B) thought that for certain websites he would be vulnerable when asking for help. He commented "if it does not involve a lot of confidential things, I would not have any privacy concerns, depending on the page I'm looking for, is it about my health situation?" Four participants did not think the crowd would pose any privacy or security risks. For instance, P7 (LV) commented "Because they can't like log in to my computer they can't see my screen, so there would be no vulnerability there."

Why Not the System?

Being used to the conventional way of browsing was the main reason why participants did not prefer the system, which was also the major perceived advantage of the conventional method, with three participants mentioning it in Phase 1 and three in Phase 2, but they all noted they would use the system as a fallback mechanism when dealing with unfamiliar websites and difficult navigation. For example, P4 (WVI) noted "right now I don't need it. But if this system exists I will immediately put it onto my computer so that if I need help or get confused I can use it when I visit new websites." Although being familiar with it, participants noted cons of the conventional method such as inconsistency across websites and hidden links and pages. For instance P3 (WVI) highlighted "every website's different [ ... ] you have to learn each website." Interestingly, two participants commented that with conventional browsing, you can't ask someone for help. For instance, P6 (WVI) noted "if the website is just not navigable, you can't just hit a button and ask someone for help." This may have had to do with their use of the system in the study. 4.4.5

When is the System Most Useful?

Participants found the system to be most useful to find pages related to tasks that are common across websites (five participants) and for tasks involving hard-to-find links and pages (seven participants).

Common tasks. P1 (B) defined the common pages to be "basic needs of websites" and found the system useful for those. Similarly, P5 (WVI) made a comment about search engines and how the results are not "synchronized" across websites. She gave an example saying "if I was to perform a search on [anonymized news website], it's mostly gonna search their articles, whereas I'm gonna search something on Gmail, they're mostly going to pull up my emails, and if I search something on Verizon, it's mostly going to search my login." She explained that with a "synchronized search," she "would search for login, it would always go to my login, instead of on [anonymized news website] it searches for articles on login."

Complex websites. P3 (WVI) pointed out that the system can be most useful for tasks that every website will support but they are not immediately visible. She stated "for finding things that almost every website has that aren't immediately obvious to the eye like help contact cause often places try to hide their contact." On the same note, P13 added that the system could come in handy "in a big website you have to browse through a lot of pages, there it can help a lot, you don't have to go through everything to find something, you just have to go to the website, press shift twice and it's there." Participants highlighted that being taken to these pages with the system avoids unnecessary work, being particularly helpful to screen reader users, who often have to memorize steps to complete a certain task. For instance, P9 (B) commented on his navigation hurdles, saying "if I can get a page in four steps [today], tomorrow is different, tomorrow is six steps and it is very hidden," also adding that he would use the system to "use new websites that I have never used easily, I can go to new websites and can easily access I believe." This can be particularly useful when users are trying to complete a task that they don't frequently complete, as pointed out by P10 (B), who said "things I don't do very often like registering to vote, applying for a loan, or searching for an ATM." However, going straight to the target page may hinder exploration. For instance, P10 also noted that with the conventional method "you kind of get a feel for how the web page is laid out. So if you're looking for something different next time you might already have an idea of where to find it or as you're browsing links to try to find something you might find something else that you didn't know was there."

When is the System Unnecessary?

Participants thought the system to be unnecessary when they could easily find the target pages for their tasks (five participants) and when they already knew how to complete a certain task (three participants). Easy-to-find intents P2 (LV) commented "when I easily could find the information on the page myself. It would all depend. I might just use the system so do I trust the system because I know it's going to take me where I wanna be taken instead of actually looking for it on the screen. It wouldn't be necessary it would be more of a help." She made this comment after cases where she had to use the system in the study but the link to the target page was visible.

Familiar websites and tasks. In other instances, participants thought the system to be unnecessary when they are familiar with a certain website or task. For instance, P8 (B) noted "I would say on the sites that I am very familiar with. I would not go through login or anything like that on a site that I am very familiar with or once it is very easy to use with JAWS, like Amazon I find it very easy to use." Her comment was echoed by P10 (B), who added "the things I already knew how to do or the things that I have a pretty good idea of how to do."

User Suggestions. In both phases, participants were asked what improvements could be made to both the system and the conventional method.

The system. In Phase 1, common suggestions for the system were focused on making the system work with more websites (four participants) and supporting more intents (four participants), whereas in Phase 2, suggestions for the system centered around making the system more like a personal assistant (five participants) and crowdsourcing features (five participants).

Personal assistant. Five participants made suggestions about making the system resemble a personal assistant. For instance, P12 (WVI) suggested "for the the system I would recommend a voice version so somewhere people might not need to type so just say it and that takes [them] to the page." P3 (WVI) suggested the system to adopt a more humanly presentation, saying "I would like it to be more inviting, like with a smiley face or something that makes it feel like that's my friend. That's my go to person right there." P10 (B) noted he would like the system to support more tasks, saying "you could expand it to describe a picture on the screen, make it more versatile maybe find other ways they could help like reading a graphic or solving a CAPTCHA. Make it one tool that could cover a bunch of things." He also suggested the system to interface with websites to complete shopping tasks, adding "it would be cool if I could type in what I want and the system would maybe come back and say here's the top 10 matches based on what you typed. And just by clicking on it, it would add it to your cart."

Affinity groups. P3 (WVI), P8 (B), and P12 (WVI) suggested affinity groups within the system. P3 said "it would be useful if I could identify a group of people I wanted to have as my personal cluster of people who I ask [ . . . ] I want these 10 people if I could group them like ask group one ask group two I could have for different projects" P8 would prefer people who know her or people belonging to the same group (e.g., blind users). She said "strangers don't know you and your habits and the things you are interested in," she added that for certain intents it would be useful to get help from another blind user, saying "if there is another blind person helping you, I mean they may be more familiar with the site or whatever, can find something quicker, or know where to look for something." P12 noted he would be interested in narrowing down the helpers to particular groups of people in some instances, commenting "I would ask someone who is also Chinese but then has lived here for a long time, you know like Chinese American, who knows Chinese so then the person may know exactly or I could even type write directly in Chinese and then the person would see it but this is what you should look for in English."

Crowd favorites. Another common suggestion was centered around allowing the system to include personal and crowd favorites. For instance, P5 (WVI) mentioned she would like to use "a favorite command, like if I hit shift, for example, looking for contact phone number, it would know what I wanted the contact phone number, so like a favorites or recently used." P8 (B) echoed P5's comments, but added that the seeing crowd "favorites" would be a "way of seeing how other people have dealt with things." P1 (B) and P7 (LV) wished the crowdsourcing would allow users to chat back and forth to give more details about their intent. For example, P1 (B) noted suggested "it should be designed—like, if I press help, there is someone in help desk, for example, he or she should ask which kind of help you need."

4.5.2 Conventional Browsing. In both phases, suggestions for the conventional browsing focused on website design such as making them more consistent (eight in Phase 1, ten in Phase 2) and improving accessibility (three in Phase 1, two in Phase 2). For instance, P3 (WVI) noted "I just think we have to have more universal design frankly for websites so those of us that go across hundreds of them wouldn't have to figure every single one out." Users with visual impairments also emphasized the lack of accessibility on websites such as inaccessible links or page regions. For example, P10 (B) commented on his difficulty dealing with website changes and accessibility design in general "up until 2 weeks ago, their website to check my messages was very accessible but suddenly they've changed something and I've gotta read my messages and its nearly impossible to figure out what to click or how to read them cause they have it formatted now." He was referring to a website where he accessed medical records.

Discussion

Intent-Oriented Browsing

The results suggest intent-oriented browsing may be useful in supporting users when completing tasks that are common across websites (e.g., contact) as well as tasks that are specific to the website at hand (e.g., pay bill on credit card website). This may require target pages for transactional and navigational goals to surface on search results, which is still not a reality in most search engines, unless the websites are structured in this manner. For example, when a credit card website has hyperlinks and pages saying "Pay my bill." Moreover, the work suggests there's advantages in providing transactional and navigational browsing within the website, without requiring users to leave the website and use search engines.

Browsing based on intents may allow users to skip navigational hurdles as well as avoid inconsistencies caused by different design choices of website developers. This is especially beneficial in the case of users with visual impairments, which have to rely on assistive technology to go from page to page, often encountering inaccessible content and continually changing websites. This is a clear example of task-level assistance in accessibility, which is more concerned with getting things done rather than simply making content accessible. This has implications to both the design of assistive technology and the design of websites in general. First, the present invention demonstrates how user intents could be incorporated into assistive technology, which as of now relies on describing page content rather than supporting user goals, leaving it up to users to "figure it out." State-of-the-art assistive technology could leverage machine learning, crowdsourcing, and even search engines to empower users to complete common tasks. Second, in designing websites, developers may help users by providing a list of tasks that can be accomplished on the website. Some government websites do this (for example, DMV websites), where the navigation is focused on what the user is trying to do online, which will then surface high-level user goals on search engine results. This caused fallback search queries to work well with the tested DMV website. Another alternative would be to develop metadata incorporated into web pages to allow developers to map certain pages to high-level user goals that are pertinent to each website. While it is impractical to expect the web to change and accommodate these, it would provide a consistent way to integrate user intents into search engines and personal assistants.

Even though some users without visual impairments did not prefer browsing with the system, they see the value of the system as a useful complementary feature, especially in cases where target pages may be hidden, inter-page navigation may prove cumbersome, when completing infrequent tasks, or when trying to complete a task on an unfamiliar website. This suggests that intent-oriented browsing may appeal the most to users browsing under constrained modalities (e.g., screen readers), however, many users may resort to entering their intents when struggling to find target pages on their own. Therefore, a wide range of users can benefit from intent-oriented navigation.

One of the constrained modalities that can benefit from intent-oriented browsing is small form-factor devices such as smartphones and tablets. One of the participants (P10, blind) noted that he would use the system every time if it was available on his iPhone, saying "if I was on a device where it was harder to type then I think navigating the links with the system would be excellent I would probably use it every time." Intent-oriented browsing could be implemented via personal assistants such as Siri and Google Now, benefiting not only users with visual impairments, but also anyone who may find challenging to browse on small screens and keyboards. For this reason, personal assistants may support users in completing tasks on websites and the present invention will contribute in this direction.

Users could have mixed feelings about privacy in receiving help with their intents. While some thought they could be vulnerable, others made up their mind based on their understanding of the technology. For example, some users thought they could not be hacked when the helper is trying to find the page for them, not completing the task on their behalf. This is in line with prior work on crowdsourcing: while privacy concerns may hinder adoption, they can be mitigated by making users aware of how systems operate, which in the case could include statements such as "help is anonymous" or "there's no direct connection between your computer and the helper's." Other solutions may involve affinity groups, (e.g., workplace, friends, family), which was observed in the study, and reputation systems.

Design Challenges

While content mixing up with tasks may get in the way of intent-oriented browsing (e.g., a news piece about "login"), it may be needed in case of informational queries (e.g., a user is interested in finding articles about "login"). Several times in the study the fallback search would bring users to a search for "log in" showing keyword-matching items. Therefore, search engines should become aware of recognizable user intents for different categories of websites as well as common intents in order to prioritize search results. Ideally developers want to make intelligent systems as effective as possible, but a critical design challenge is how to design intent-oriented browsing that fails gracefully?

In supporting transactional browsing, a major challenge for search engines and systems is supporting transactions within restricted areas. For example, in order to check bank account balances, users must first log in. This is not a new challenge to search engines, and realistic solutions may involve developers adding metadata to their pages to map user intents to pages as well as providing users with a list of transactions post-login. This is also a major challenge for supervised learning approaches aimed at predicting target pages, since developing a web scraper to collect training data from restricted areas of websites on a large scale is no trivial endeavor.

Rather than predicting user intents, users were allowed to enter their intent directly. What are other ways to implement intent-oriented browsing? For example, simply taking users to target pages gives them more agency as opposed to programming by demonstration approaches, but there are more levels in completing a task than just going to the page. Perhaps a combination of intent prediction based on usage behavior, target page identification, and page-level interactions would provide more extensive support.

Another open challenge in this direction is how to support long-term intents, e.g., "get a driver's license?" In that case, the relevance of target pages would change over time. Building on this approach, stages could be incorporated into system intents to allow the model to predict likely hyperlinks for each stage based on user activity. Crowdsourcing can also contribute to growing the list of system-supported intents via machine learning. For example, when target pages get marked for a specific intent on many websites, the supervised model could automatically be trained on that intent in order to predict pages for the same intent in the future. The list of supported intents could also grow by collecting data in a large scale for distant supervision, like in the present invention.

Considering user intents in browsing the web can greatly benefit users in getting things done online, especially users with visual impairments. The present invention was designed and evaluated for intent-oriented browsing based on direct input of intents. Machine learning and crowdsourcing was used in order to support various user goals on different websites. The results suggest intent-oriented browsing may be most useful for users with visual impairments, but it can also benefit users without visual impairments in completing tasks on websites that are unfamiliar and/or difficult to use. Mapping target pages to user intents based on hyperlinks and crowdsourcing may be promising directions in helping users complete tasks on websites, but affinity groups may be preferred. The present invention contributes to the design of personal assistants aimed at completing tasks on websites and the design of assistive technology focused on supporting high-level user goals.

As described above, the present invention may be a system, a method, and/or a computer program associated therewith and is described herein with reference to flowcharts and block diagrams of methods and systems. The flowchart and block diagrams illustrate the architecture, functionality, and operation of possible implementations of systems, methods, and computer programs of the present invention. It should be understood that each block of the flowcharts and block diagrams can be implemented by computer readable program instructions in software, firmware, or dedicated analog or digital circuits. These computer readable program instructions may be implemented on the processor of a general purpose computer, a special purpose computer, or other programmable data processing apparatus to produce a machine that implements a part or all of any of the blocks in the flowcharts and block diagrams. Each block in the flowchart or block diagrams may represent a module, segment, or portion of instructions, which comprises one or more executable instructions for implementing the specified logical functions. It should also be noted that each block of the block diagrams and flowchart illustrations, or combinations of blocks in the block diagrams and flowcharts, can be implemented by special purpose hardware-based systems that perform the specified functions or acts or carry out combinations of special purpose hardware and computer instructions.

What is claimed is:

1. A system for providing users with intent based web page selection, comprising the steps of
   an intent repository containing a plurality of known intents mapped to a plurality of target pages and a plurality of hyperlink hashes;
   a website server supporting a website and programmed to transmit a plurality of hyperlinks representing pages of the website;
   a prediction server programmed to receive the plurality of hyperlinks from the website server and to send a plurality of target hyperlinks that the prediction server has determined correspond to the plurality of known intents back to the website server; and
   a browser having a user script programmed to connect to the intent repository and to the prediction server, wherein the user script is programmed to allow a user to enter a user selected intent, to display any of the plurality of target hyperlinks received from the prediction server that correspond to the user selected intent.

2. The system of claim 1, wherein the user script is further programmed to allow the user to select one of the target hyperlinks.

3. The system of claim 2, wherein the user script is further programmed to redirect the browser to the selected one of the hyperlinks.

4. The system of claim 3, wherein the user script is further programmed to allow the user to confirm whether any displayed plurality of target hyperlinks actually correspond to the user selected intent.

5. The system of claim 4, wherein the user script is further programmed to allow the user to manually select one of the hyperlinks.

6. The system of claim 5, wherein the prediction server is programmed to determine whether a target page corresponds to a known user intent using a machine learning model trained with hyperlink features.

7. The system of claim 6, wherein the hyperlink features are at least one feature selected from the group consisting of text, content, position, length, and url words.

8. The system of claim 7, wherein the machine learning model comprises a Support Vector Machine classifier with linear kernel trained via distant supervision and manual labeling.

9. A method for providing users with intent based web page selection, comprising the steps of:
providing an intent repository containing a plurality of known intents mapped to a plurality of target pages and a plurality of hyperlink hashes;
providing a website server supporting a website and programmed to transmit a plurality of hyperlinks representing pages of the website;
providing a prediction server programmed to receive the plurality of hyperlinks from the website server and to send a plurality of target hyperlinks that the prediction server has determined correspond to the plurality of known intents back to the website server; and
providing a browser having a user script programmed to connect to the intent repository and to the prediction server;
allowing a user to enter a user selected intent with the user script; and
displaying any of the plurality of target hyperlinks received from the prediction server that correspond to the user selected intent with the user script.

10. The method of claim 9, further comprising the step of allowing the user to select one of the target hyperlinks.

11. The method of claim 10, further comprising the step of redirecting the browser to the selected one of the hyperlinks.

12. The method of claim 11, further comprising the step of allowing the user to confirm whether any displayed plurality of target hyperlinks actually correspond to the user selected intent.

13. The method of claim 12, further comprising the step of allowing the user to manually select one of the hyperlinks.

14. The method of claim 13, wherein the prediction server is programmed to determine whether a target page corresponds to a known user intent using a machine learning model trained with hyperlink features.

15. The method of claim 14, wherein the hyperlink features are at least one feature selected from the group consisting of text, content, position, length, and url words.

16. The method of claim 15, wherein the machine learning model comprises a Support Vector Machine classifier with linear kernel trained via distant supervision and manual labeling.

\* \* \* \* \*